Jan. 24, 1928.
B. FORD
1,657,252
SECONDARY OR STORAGE BATTERY
Filed May 2, 1927
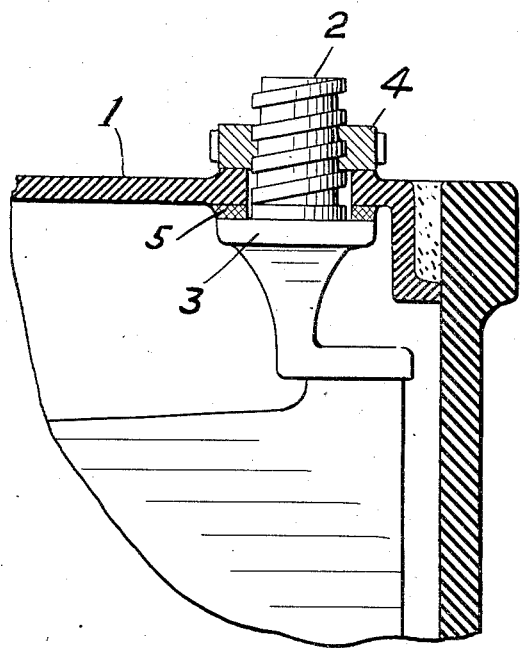
WITNESS.
INVENTOR
Bruce Ford
BY
Augustus B Stoughton
ATTORNEY.

Patented Jan. 24, 1928.

1,657,252

UNITED STATES PATENT OFFICE.

BRUCE FORD, OF PHILADELPHIA, PENNSYLVANIA.

SECONDARY OR STORAGE BATTERY.

Application filed May 2, 1927. Serial No. 188,075.

The present invention relates to an improved sealing closure for the hard rubber cell wall and the lead alloy flange of the conductor of a storage battery, and one object of the invention is to prevent leakage or even capillary seepage, and to this and other ends hereinafter set forth the invention comprises a gasket surrounding the conductor and interposed between the hard rubber wall and the flange and composed of a rubber compound primarily and at assembly partly vulcanized, and inherently adapted after assembly and under compression between the surfaces of the cover and flange to further vulcanize itself fast to those surfaces and prevent leakage and capillary seepage.

The invention further comprises the improvements to be presently described and finally claimed.

Reference will be made to the single figure of the accompanying drawing which is a sectional view illustrating a sealing closure embodying features of the invention.

In the drawing 1 is the hard rubber cover through which passes a terminal post 2 provided on the under side of the cover with a flange 3. 4 is a means for pressing the cover toward the flange.

Interposed between the flange and cover is a gasket 5 and according to my invention this gasket is composed of a rubber compound which is either self vulcanizing or is only partly vulcanized and adapted to further vulcanize with heat or age. Rubber material of this character when tightly held by compression against either a metal surface or a hard rubber surface will vulcanize itself fast to those surfaces and prevent leakage or even capillary seepage. The gasket 5 of the described material and characteristics and qualities can either be a loose piece or it may be made integral with the hard rubber cover while molding the latter. This can be taken care of in the nature of the compounds used for the cover or by partially vulcanizing the cover before inserting the gasket into the mold and finishing the vulcanizing of the cover, which only partially vulcanizes the gasket.

I claim:

1. A sealing closure for the hard rubber cell wall and the lead alloy flange of the conductor of a storage battery, which comprises a gasket surrounding the conductor and interposed between the hard rubber wall and the flange and composed of a rubber compound primarily and at assembly only partially vulcanized and inherently adapted after assembly and under compression between the surface of the cover and flange to further vulcanize itself fast to those surfaces and prevent leakage and capillary seepage.

2. A sealing closure for the hard rubber cell wall and the lead alloy flange of the conductor of a storage battery, which comprises a gasket integral with the cover and surrounding the conductor and interposed between the hard rubber wall and the flange and composed of a rubber compound primarily and at assembly only partially vulcanized and inherently adapted after assembly and under compression between the surface of the cover and flange to further vulcanize itself fast to those surfaces and prevent leakage and capillary seepage.

BRUCE FORD.